United States Patent
Charles et al.

(10) Patent No.: US 10,498,853 B2
(45) Date of Patent: Dec. 3, 2019

(54) CLOUD-BASED DATA SESSION PROVISIONING, DATA STORAGE, AND DATA RETRIEVAL SYSTEM AND METHOD

(71) Applicant: Walmart Apollo, LLC, Bentonville, AR (US)

(72) Inventors: Kevin M. Charles, Bentonville, AR (US); John Randy Frerking, Prairie Grove, AR (US); Richard Jackson, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 228 days.

(21) Appl. No.: 15/277,896

(22) Filed: Sep. 27, 2016

(65) Prior Publication Data

US 2017/0094005 A1    Mar. 30, 2017

Related U.S. Application Data

(60) Provisional application No. 62/233,750, filed on Sep. 28, 2015.

(51) Int. Cl.
*H04L 29/08* (2006.01)

(52) U.S. Cl.
CPC ........ *H04L 67/2842* (2013.01); *H04L 67/141* (2013.01); *H04L 67/143* (2013.01); *H04L 67/146* (2013.01)

(58) Field of Classification Search
CPC . G06F 21/335; G06F 3/14; G06F 8/61; G06F 9/541; G06Q 10/10; H04L 47/122; H04L 51/04; H04L 63/102; H04L 63/166; H04L 65/1083; H04L 65/4076; H04L 67/141; H04L 67/2842; H04L 67/143; H04L 67/146; H04W 12/02; G05B 19/4185
See application file for complete search history.

(56) References Cited

U.S. PATENT DOCUMENTS

| | | |
|---|---|---|
| 5,913,217 A | 6/1999 | Alger |
| 7,024,394 B1 | 4/2006 | Ashour et al. |
| 7,111,291 B2 | 9/2006 | Loy et al. |

(Continued)

FOREIGN PATENT DOCUMENTS

| | | |
|---|---|---|
| EP | 1077414 | 2/2001 |
| EP | 1202187 | 5/2002 |

OTHER PUBLICATIONS

IBM Knowledge Center http://www.01.ibm.com/support/knowledgecenter/SSAW57_8.5.5/com.ibm.websphere.nd.doc/ae/cprs_sesm.html.

(Continued)

*Primary Examiner* — Le H Luu
(74) *Attorney, Agent, or Firm* — Patterson Thuente Pedersen, P.A.; Olajumoke Kassim; Amy Salmela (57) ABSTRACT

A system for providing a cloud-based data session can be implemented to allow access to session data for client applications across multiple platforms and environments. In embodiments, a system for provisioning data sessions includes a session provision service, cache provision service, unique identifier provision service, and a data store. The unique identifier provision service is programmed to create a unique identifier that is guaranteed to be globally unique across multiple systems so that each unique identifier is unique assigned to only one data session.

14 Claims, 4 Drawing Sheets

(56) References Cited

U.S. PATENT DOCUMENTS

| | | |
|---|---|---|
| 7,720,686 B2 | 5/2010 | Volk |
| 7,739,512 B2 | 6/2010 | Hawkes |
| 8,255,247 B2 | 8/2012 | Mésser |
| 8,553,867 B2 | 10/2013 | Callanan et al. |
| 8,583,790 B2 | 11/2013 | Nalla et al. |
| 8,671,025 B2 | 3/2014 | Mehra |
| 8,782,014 B2 | 7/2014 | Shepard et al. |
| 9,706,012 B2 | 7/2017 | Tanimoto |
| 9,769,368 B1 | 9/2017 | Morford |
| 2001/0034668 A1 | 10/2001 | Whitworth |
| 2002/0111870 A1 | 8/2002 | Chinnappan |
| 2003/0016250 A1 | 1/2003 | Chang |
| 2003/0036997 A1 | 2/2003 | Dunne |
| 2003/0069878 A1 | 4/2003 | Wise |
| 2004/0187015 A1 | 9/2004 | Geer |
| 2005/0210019 A1 | 9/2005 | Uehara |
| 2005/0262075 A1* | 11/2005 | Beartusk ............... G06Q 10/10 |
| 2006/0122915 A1 | 6/2006 | Allen |
| 2007/0067179 A1 | 3/2007 | Kerr |
| 2007/0143082 A1 | 6/2007 | Degnan |
| 2007/0180468 A1 | 8/2007 | Gill |
| 2008/0071559 A1 | 3/2008 | Arrasvuori |
| 2009/0043864 A1 | 2/2009 | Shetty |
| 2009/0094315 A1 | 4/2009 | Nadel |
| 2009/0016995 A1 | 7/2009 | Banga |
| 2009/0282468 A1 | 11/2009 | Banga |
| 2010/0149217 A1 | 6/2010 | Mielke |
| 2010/0293281 A1 | 11/2010 | Tsimelzon |
| 2011/0093613 A1 | 4/2011 | Banes |
| 2011/0173251 A1* | 7/2011 | Sandhu .................. G06F 8/61 709/203 |
| 2012/0019564 A1 | 1/2012 | Almgren |
| 2012/0166299 A1 | 6/2012 | Heinstein |
| 2012/0324365 A1* | 12/2012 | Momchilov ............ G06F 3/14 715/738 |
| 2013/0086652 A1* | 4/2013 | Kavantzas ............ G06F 21/335 726/5 |
| 2013/0174015 A1 | 7/2013 | Kwan |
| 2013/0212420 A1* | 8/2013 | Lawson ............. G05B 19/4185 713/400 |
| 2013/0305036 A1* | 11/2013 | Vos ....................... H04L 63/166 713/151 |
| 2014/0013375 A1 | 1/2014 | Giladi |
| 2014/0139700 A1 | 5/2014 | Sato |
| 2014/0153422 A1* | 6/2014 | Nambiar ............... H04L 47/122 370/252 |
| 2014/0215120 A1 | 7/2014 | Inmar |
| 2014/0222930 A1* | 8/2014 | Gangadharan .......... H04L 51/04 709/206 |
| 2014/0223011 A1* | 8/2014 | Smith ................ H04L 65/1083 709/226 |
| 2014/0223452 A1* | 8/2014 | Santhanam ............. G06F 9/541 719/328 |
| 2014/0304421 A1 | 10/2014 | Karaoguz et al. |
| 2015/0088978 A1 | 3/2015 | Motukuru et al. |
| 2016/0036818 A1* | 2/2016 | Patesaria ............... H04L 63/102 726/3 |
| 2016/0219089 A1* | 7/2016 | Murthy ............... H04L 65/4076 |
| 2016/0285976 A1* | 9/2016 | Chan .................... H04W 12/02 |
| 2017/0094005 A1 | 3/2017 | Charles |
| 2017/0134357 A1* | 5/2017 | Ohlsson ................ H04L 67/141 |
| 2017/0171322 A1 | 6/2017 | Golding |
| 2017/0364601 A1 | 12/2017 | Charles |

OTHER PUBLICATIONS

Universally Unique Identifier (UUID) (RFC 4122), as available on Feb. 2, 2019 at https://www.famkruithof.net/uuid/uuidgen, 1 page.
IBM, *Session Management Support,* as available at https://www.ibm.com/support/knowledgecenter/SSAW57_8.5.5/com.ibm.websphere.nd.multiplatform.doc/ae/cprs_sesm.html , retrieved on Nov. 27, 2018, 4 pages.
International Preliminary Report on Patentability, Application No. PCT/US2016/054019, dated Apr. 12, 2018, 7 pages.
International Preliminary Report on Patentability, Application No. PCT/US2015/063721, dated Jun. 15, 2017, 10 pages.
International Search Report, International Application No. PCT/US2015/063721, dated Feb. 9, 2016, 2 pages.
Written Opinion, International Application No. PCT/US2015/063721, dated Feb. 9, 2016, 8 pages.
Application and File History for U.S. Appl. No. 15/533,267, filed Jun. 5, 2017, Inventors: Charles et al.
International Search Report and Written Opinion, Application No. PCT/US16/54019, dated Dec. 8, 2016, 15 pages.
European Search Report , Application No. 12165061.8, completed Oct. 16, 2012, 2 pages.
European Search Report , Application No. 11195726.2, completed Jun. 5, 2012, 3 pages.
Canadian Examination Search Report, Application No. 2,969,713, dated Oct. 4, 2018, 4 pages.

* cited by examiner

CLOUD-BASED DATA SESSION PROVISIONING, DATA STORAGE, AND DATA RETRIEVAL SYSTEM AND METHOD

CROSS-REFERENCE TO RELATED APPLICATIONS

This application claims the benefit of U.S. Provisional Patent Application 62/233,750, filed Se. 28, 2015, and titled "Cloud Based Session Management System", the entire contents of which are hereby incorporated herein by reference.

BACKGROUND

At times, a user accesses a website or other application and then wishes to move the session to a second computer platform. However, if the session data is stored on a single computing device, switching may be difficult or inefficient because the session data might not be easily transferred from one device to another.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for providing data sessions that are maintained in a cloud-based environment accessible across multiple platforms. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

According to various embodiments of the present disclosure, systems and methods described herein are adapted to store temporary user data for various applications across multiple platforms, by generating a unique identifier for a data session to reference the data uniquely and a database application to store the raw data that may then be accessed for subsequent use across the multiple platforms. As used in the present disclosure, a "unique identifier" is a number, alphanumeric sequence, or other data session identification that is guaranteed to be globally unique. The unique identifier may be uniquely and exclusively associated with a cloud-based data session.

Figure 1:
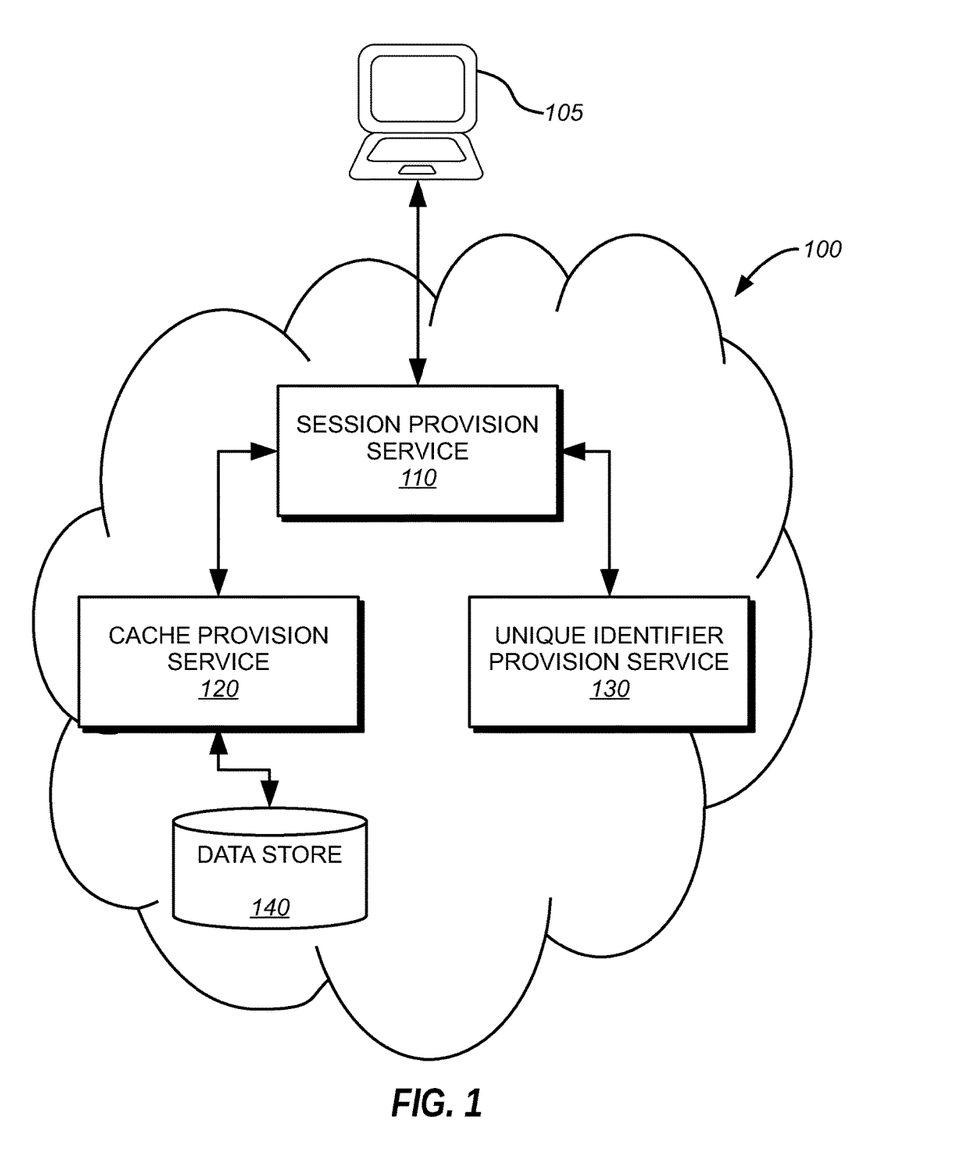
FIG. 1 is a block diagram illustrating a session management system according to one embodiment of the present disclosure.

FIG. 1 is a block diagram depicting a session management system 100 according to one embodiment of the present disclosure. In an embodiment, session management system 100 includes a session provision service 110, cache provision service 120, and unique identifier provision service 130. According to various embodiments, the foregoing components and/or modules may be embodied as computer-readable instructions stored on various types of media. Any combination of one or more computer-usable or computer-readable media may be utilized in various embodiments of the present disclosure. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

In one embodiment, session provision service 110 comprises a computer processor and computer-readable instructions that direct the processor to interface with a user and/or user application 105 over a network. Embodiments of session provision service 110 are further adapted to transmit and receive requests and data from and/or to the user and/or user application 105, cache provision service 120, and unique identifier provision service 130. In embodiments, session provision service 110 can receive a request from a user and/or user application 105 to provision a new endpoint/data session. In response to receiving such a request, session provision service 110 can transmit a request to cache provision service 120 to create a new cache provision endpoint based on the request.

In embodiments, session provision service 110 can receive and store the new cache provision endpoint and transmit a request to unique identifier provision service 130 to generate a unique identifier for the new cache provision endpoint. In embodiments, session provision service 110 can receive the newly generated unique identifier, process the unique identifier to associate it with the new cache provision endpoint, and transmit the new unique identifier and other information related to the new cache provision endpoint back to the user and/or user application 105.

Embodiments of session provision service 110 are adapted to provide an application program interface for the user and/or user application 105 to submit requests for new endpoint/data sessions. Other embodiments provide a user interface for submitting such requests. In one example, a user interface comprises a website gateway through which the user 105 can create a request for a new endpoint.

In embodiments, the user and/or user application 105 can select and submit additional options regarding the new data session. For example, in one embodiment, the user and/or user application 105 can choose and submit a session expiration time limit for that endpoint. Session provision service 110 is programmed to receive and process such selections and transmit the same to cache provision service 120.

In embodiments, session provision service 110 can receive session data from a user and/or user application 105. In some cases, the received session data includes metadata such as a unique identifier for a previously created data session at which the data should be stored. Session provision service 110 can transmit the data and unique identifier to cache provision service 120 to store the session data at the endpoint identified by the unique identifier. Alternatively, if there is no existing data session that is identified by the unique identifier received by session provision service 110, session provision service 110 can transmit a request to cache provision service 120 to generate a new data session and a request to unique identifier provision service 130 to generate a new unique identifier for the new data session. Upon provision of the new data session, session provision service 110 can transmit the received session data to cache provision service 120 for storage of the session data.

In various embodiments, session provision service 110 can receive a request for session data. The request may include a unique identifier that identifies a data session endpoint where the requested session data is stored. The request may further identify or define the scope of data requested. Embodiments of session provision service 110 are adapted to request cache provision service 120 for the data, receive the data from cache provision service 120, and transmit the requested data back to the user and/or user application 105. The request for the data transmitted from session provision service 110 to cache provision service 120 may include the unique identifier for the data session endpoint.

In various embodiments, session provision service 110 can receive a request to modify session data or a portion of session data. The request may include a unique identifier that identifies a data session endpoint where the session data is stored. The request may further identify or define the scope of data to be modified. The request may further include data to be added to the identified data session. Embodiments of session provision service 110 are adapted to request cache provision service 120 to modify and/or augment the data, receive a confirmation from cache provision service 120 that the modification has been accomplished, and transmit the confirmation back to the user and/or user application 105. In embodiments, the modified and/or augmented data is transmitted from cache provision service 120 to session provision service 110. In embodiments, the modified and/or augmented data is transmitted from session provision service 110 to the user and/or user application 110. The request to modify transmitted from session provision service 110 to cache provision service 120 may include the unique identifier for the data session endpoint.

In various embodiments, session provision service 110 can receive a request to delete session data or a portion of session data. The request may include a unique identifier that identifies a data session endpoint where the session data is stored. The request may further identify or define the scope of data to be deleted. Embodiments of session provision service 110 are adapted to request cache provision service 120 to delete the data, receive a delete confirmation from cache provision service 120, and transmit the delete confirmation back to the user and/or user application 105. The request to delete transmitted from session provision service 110 to cache provision service 120 may include the unique identifier for the data session endpoint.

In one embodiment, cache provision service 120 comprises a computer processor and computer-readable instructions that direct the processor to receive requests from session provision service 110, provision a new data session according to each request, and return the data session endpoint back to session provision service 110. In embodiments, cache provision service 120 can receive various options pertaining to each request for a new data session and provision the new data session accordingly.

In embodiments, cache provision service 120 is programmed to receive session data linked to a unique data session. In particular, the data may be associated with a unique identifier that was previously generated by unique identifier provision service 130. In such cases, cache provision service 120 can identify the relevant data session endpoint and store the session data at the endpoint.

In one embodiment, cache provision service 120 can receive session data from session provision service 110 with instructions to add the session data to an existing data session endpoint. Such requests may include a unique identifier that is associated with the existing data session. Cache provision service 120 can determine if the identified data session exists and, if so, add the session data to the data session. If the identified data session does not exist, cache provision service 120 can transmit a response to session provision service 110 indicating that there is no existing data session. In response, session provision service 110 can take steps to provision a new data session, create a new unique identifier associated with the new data session, store the session data at the new data session endpoint, and return the unique identifier to the user and/or user application 105.

In one embodiment, cache provision service 120 can receive instructions from session provision service 110 to delete session data from an existing data session endpoint. Such requests may include a unique identifier that is associated with the existing data session.

In embodiments, session data may be transmitted from cache provision service 120 to data store 140 to be stored there. In embodiments, data store 140 aggregates multiple data sessions that are indexed by the unique identifier of each data session.

In one embodiment, unique identifier provision service 130 comprises a computer processor and computer-readable instructions that direct the processor to generate a unique identifier to be associated with a data session. Embodiments of unique identifier provision service 130 are programmed to create a unique identifier in response to a request from session provision service 110. Embodiments of unique identifier provision service 130 are capable of fulfilling requests for multiple entity types and applications, and may be capable of ensuring that such unique identifiers are globally unique among systems.

In various embodiments, unique identifier provision service 130 is implemented on an IBM mainframe system using z/OS. In other embodiments, unique identifier provision service 130 is implemented on virtual servers. Embodiments of unique identifier provision service 130 may be arranged in a failover configuration for redundancy and increased reliability.

Figure 2:
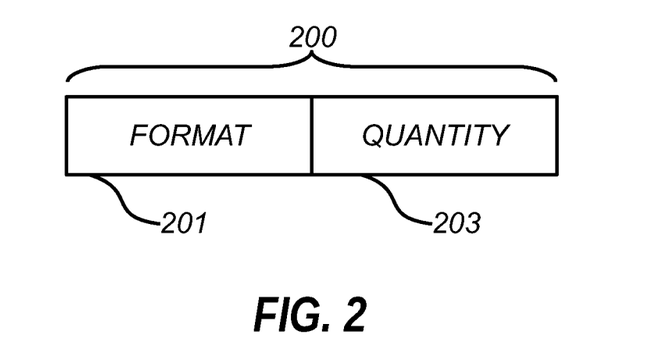
FIG. 2 depicts an example format of a request for a unique identifier according to one embodiment of the present disclosure.

In one embodiment, unique identifier provision service 130 comprises a centralized clock. Unique identifiers may include information related to the time at which the unique identifier was generated. In such cases, a centralized clock may prevent the generation of non-unique identifiers. In the case of an IBM-based environment, unique identifiers may be generated from an IBM Parallel Sysplex and clock. In embodiments, a sequential counter may be used to ensure global uniqueness for unique identifiers that are generated at the same device by different processing entities, and counter information may be used from a shared memory FIG. 2 depicts an example format of a request 200 for a unique identifier according to one embodiment of the present disclosure. As discussed above, session provision service 110 may generate and communicate a request to unique identifier provision service 130. In various embodiments, the unique identifier request may include one or more parameters that control how the unique identifier is generated.

In one example, request 200 may include format information 201 that identifies an output format of unique identifier information being generated. For instance, a request may specify that the unique identifier should be generated in a plain format, a GUID format (e.g., a conventional GUID format type), an ESS format, B64B, or other type of format. The format of the conventional GUID has been adopted in the open systems world as a 32 byte character representation of a 16 byte hexadecimal value in the following format: xxxxxxxx-xxxx-xxxx-xxxx-xxxxxxxxxxxx, such as 2e7d0f3f-00cd-74ca-359e-31c50000375a. In one implementation, the service may provide the option to provide output unique identifier information in one of the following formats:

PLAIN: 2e7d0f3f00cd74ca2a17dabe00003759
    GUID: 2e7d0f3f-00cd-74ca-359e-31c50000375a
    ESS: 2e7d0f3f-00cd74ca3d56a79f-0000375b
    B64B: a 24 byte Base64Binary encoded ID that, when decoded, is the actual 16 byte hex Unique ID According to one embodiment of the present disclosure, such request parameters may be provided as options within a query string sent to unique identifier provision service 130.

According to various aspect of the present disclosure, session provision service 110 may request creation of more than one unique identifiers in a request. For instance, the unique identifier request 200 may include information 203 that identifies whether multiple unique identifiers are being requested. In one embodiment, the request for multiple unique identifiers may be specified within an HTTP header, but it should be appreciated that the request can be formatted within any portion of request. According to one embodiment, the unique identifier information may be provided as part of a request array having array locations from 0001-1000. This feature may enable unique identifier provision service 130 to return from 1 to 1000 UIDs on a single request. In one implementation, the results are provided within a response (e.g., an HTTP response) that is pipe delimited. Because of this implementation, it is possible to provide multiple UIDs on a single request and still guarantee that the GUID information is unique and will not be duplicated, regardless of transaction volume or site origination. In another embodiment, when the HTTP header is not present in a request, the array default is 1.

Figure 3:
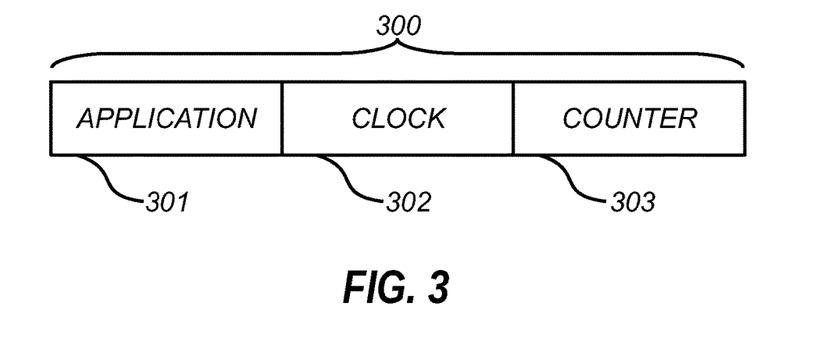
FIG. 3 depicts an example format of a unique identifier according to one embodiment of the present disclosure.

Referring now to FIG. 3, an example format of a unique identifier 300 is depicted according to one embodiment of the present disclosure. For example, there may be one or more components of the unique identifier 300. For instance, a unique identifier format may include application information 301, time representation information 302 and/or sequential counter information 303. Such information may be generated by unique identifier provision service 130. For instance, application information 301 may include information that uniquely identifies an application or service that requested the unique identifier. Time representation information 302 may include information identify corresponding to when the unique identifier was generated. Sequential counter information 303 may be a counter or other arbitration mechanism that permits unique identification of multiple unique identifiers that are requested or generated at the same time.

In one embodiment, the application information 301 comprises a 4 byte unique name that represents a particular session provision service 110. This application information 301 is chosen to be unique and is not duplicated across sites within the distributed network. According to one embodiment, the application information 301 is static, which means the application information 301 information has a speed of zero (i.e., the information does not ever change within a site). In another implementation, the application information 301 may be presented in an obscured or non-human readable manner so that the application information 301 is not recognizable by sight. In one implementation, the first four bytes of the unique identifier comprises application information 301. Because the application information 301 may be used to form part of the unique identifier, unique identifiers generated from different applications or services are guaranteed to be unique, and no coordination between sites for generating unique identifiers is necessary.

According to one embodiment of the present disclosure, absolute time information may be used to generate a unique identifier. According to one embodiment, absolute time is an 8 byte clock between microseconds and picoseconds that have elapsed since Jan. 1, 1900 at 00:00. This value may roll over to zeroes somewhere in the year 34,000.

According to one embodiment, a unique identifier can incorporate absolute time as provided by an IBM z/OS Parallel Sysplex, which can consist of one or more hardware boxes (CEC/CPC), each sharing the same time using STP or "system timer protocol" (a shared clock across all hardware in the IBM z/OS Parallel Sysplex). When using the assembler STCKE instruction on a z/OS Parallel Sysplex, the time value returned may be guaranteed to be synchronized across all hardware within the Sysplex. This means that regardless of how many operating systems (e.g., LPARs) and how many virtualized servers (e.g., CICS servers) comprise the Sysplex, every execution of the unique identifier service is guaranteed to be using the exact same clock time. Therefore, it is appreciated that if it is implemented within a computing environment that guarantees that clock time is shared among a number of executing entities, multiple computing entities may be used to sign unique identifier information responsive to service requests.

In an IBM environment, the STCKE (Store Clock Extended) instruction returns a 16 byte value, with the first byte providing carry out beyond the STCK limit (which rolls to zeros Sep. 17, 2042). The first 9 bytes (of the 16 byte value) provides the number of picoseconds that have elapsed since Jan. 1, 1900 at 00:00. In one implementation, an algorithm may use the first 8 bytes, which provides a resolution between microseconds and picoseconds, with the first byte (8 bits) extending the time beyond the year 34,000.

For example, a STCKE value of x'00CD9F77 AE0B4FFD 2400000000 01610002' represents a UTC (Universal Coordinated Time) of 13:17:42.224059 2014/08/18 (with time being truncated after microseconds in this example). The absolute time continually moves forward at the same speed and is available with 100% accuracy across all CEC/CPC (Central Electronic Complex/Central Processing Complex), all OS images (LPARs) and all servers (CICS servers).

According to some embodiments, a sequential counter may be used to ensure uniqueness for multiple requests that are serviced at the same exact time. For instance, it may be envisioned that multiple requests may be received from different session provision services 110 for a unique identifier. A centralized and shared sequential counter may be used to arbitrate between simultaneous unique identifier requests. Although a sequential counter may be used, it should be appreciated that other methods may be used to arbitrate between unique identifier requests.

In one embodiment implemented within an IBM mainframe environment, the sequential counter comprises a 4 byte binary field that resides in shared memory within the z/OS Parallel Sysplex called the Coupling Facility (CF). This counter is available to all hardware (CEC/CPCZ), OS images (LPARs) and servers (CICS servers) thru a synchronous and serialized call to retrieve and increment the counter. The sequential counter can only be accessed in memory by one task at a time, ensuring the counter is sequential and not duplicated. The sequential counter can be used to make absolute time unique should two or more service requests get the exact absolute time. The sequential counter ranges from 1 to 4,294,967,295 before rolling back to 1 and the counter can increment for each request. The sequential counter provides the ability to generate 4.2 billion unique identifiers per sub-microsecond in time.

In embodiments where there is a need to provide higher resolution of sequential counters per point in time, a simple code change to extend the sequential counter by 4 bits and reduce absolute time by 4 bits, could provide up to 68,719,476,735 unique identifiers per microsecond in time. Depending on the rate of simultaneous requests, the sequential counter moves at a rate of demand of these simultaneous requests. Therefore, it should be appreciated that by providing the ability to handle multiple simultaneous requests for multiple unique identifiers from multiple different session provision services 110 by multiple different instances of a unique identifier provision service 130, a system may be provided that can service a large number of user applications, systems, and other entities.

Embodiments of the present disclosure may be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowcharts and block diagram in the attached figures illustrate the architecture, functionality, and operation of possible implementations of systems, methods, and computer program products according to various embodiments of the present disclosure. In this regard, each block in the flowcharts or block diagram may represent a module, segment or portion of code, which comprises one or more executable instructions for implementing the specified logical function(s). It is noted that each block and/or multiple blocks in the flowcharts or block diagrams may represent one or more physical systems, such as one or more server systems, a collection of systems (e.g., bladed server systems), a cluster of systems, mainframe computer system, or any type and configuration of systems. Such systems may also include virtualized resources such as virtual server systems, and may include one or more levels of virtualization. In embodiments, such module(s) and/or segment(s) or portion(s) of code may be implemented across sites to provide redundancy in the case of site or system failure. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

Figure 4:
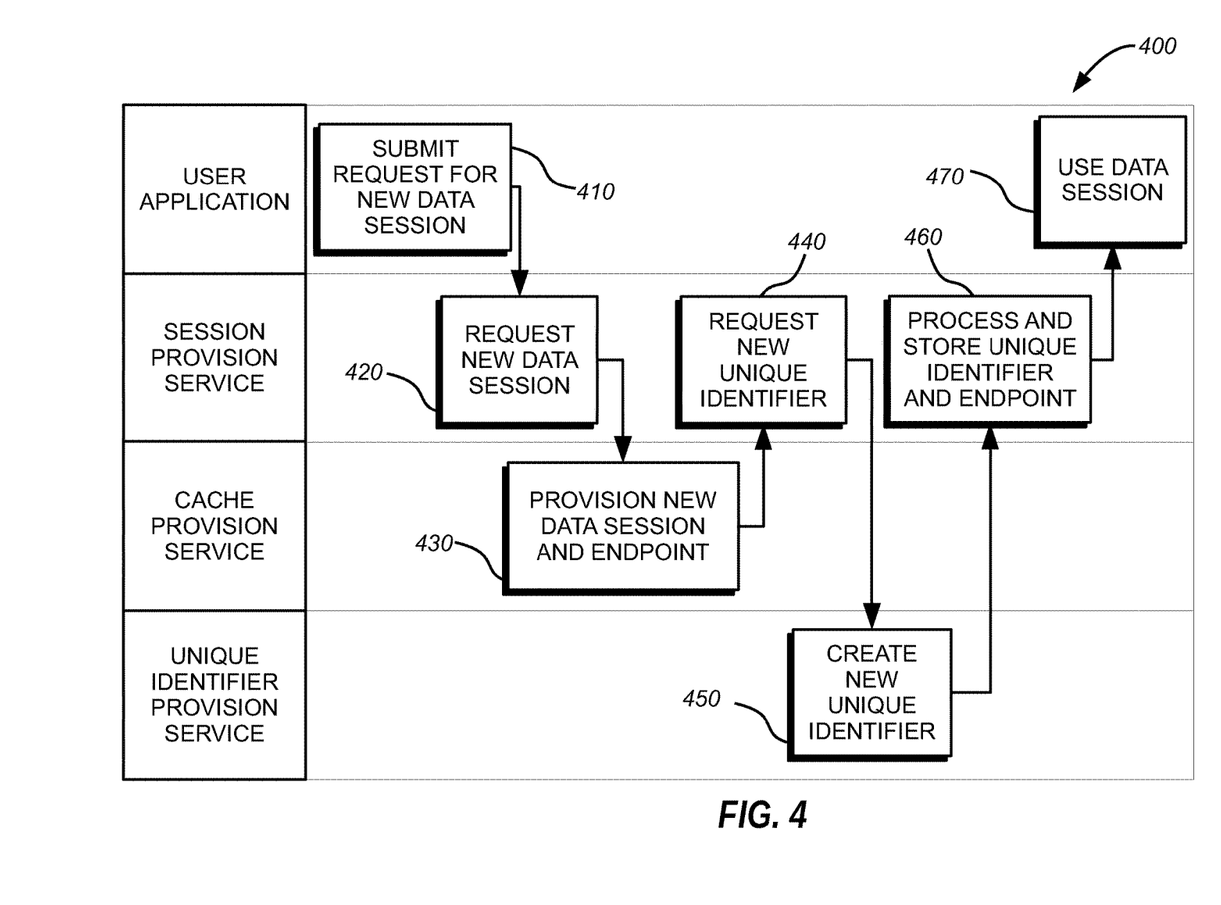
FIG. 4 is a diagram illustrating a method for provisioning a new data session according to one embodiment of the present disclosure.

In operation, embodiments of the present disclosure are configured to provision data sessions that are maintained in a cloud-based environment accessible across multiple platforms. Referring to FIG. 4, an illustration of a method 400 for provisioning a new data session is set forth according to one embodiment of the present disclosure. Method 400 begins at operation 410, where a user and/or user application submits a request for a new data session to the session provision service. In one embodiment, a user navigates to a website through which the request may be transmitted. In other embodiments, a client application transmits the request via a command interface or API. The request may include additional information or options, such as number of data sessions to provision, identification of the user and/or user application, the selected format of the data session, the expiration time for the data session, and the like.

At operation 420, to the session provision service transmits a request to the cache provision service. The request may include information from the request from the user or user application. If selected by the user and/or user application, a request for multiple data sessions may be transmitted to the cache provision service.

At operation 430, the cache provision service provisions a new data session as request and returns the data session endpoint back to the session provision service.

At operation 440, the session provision service processes and stores the endpoint and requests a new unique identifier from unique identifier provision service. The request to the unique identifier provision service may include additional request options including the format of the unique identifier and the quantity of unique identifiers requested.

At operation 450, unique identifier provision service generates a new globally unique identifier to be linked to the new data session provision. As described above, the unique identifier provision service may use one of several processes that result in a identifier that is guaranteed to be globally unique across the system. In some embodiments, unique identifier provision service may incorporate a system clock and/or a counter to ensure uniqueness of each unique identifier. The unique identifier(s) may then be transmitted back to the session provision service.

At operation 460, the session provision service processes and stores the unique identifier. The information pertaining to the newly provisioned data session, including the unique identifier, is transmitted to the user and/or user application. At operation 470, the user and/or user application begins using the data session to store and/or retrieve session data.

In embodiments, data sessions can be created, modified, read, and/or deleted by submitting requests that adhere to REST architecture and use the HTTP verbs GET, POST, PUT, and DELETE. In embodiments, commands are communicated over HTTP.

In one embodiment, a client application can submit, to the session provision service, a GET request that includes the unique identifier. In one embodiment, the GET request further identifies or defines the scope of data requested. The session provision service can then call the cache provision service to determine if a data session exists with that unique identifier. If the data session exists, it is transmitted to the session provision service and then to the client application.

In one embodiment, a client application can submit, to the session provision service, a POST request that includes a data object or other data to be stored at a data session. The session provision service can request a new unique identifier from unique identifier provision service. Once the new unique identifier is generated, session provision service can call the cache provision service to store the data object or other data to be stored at a new data session that will be associated with the new unique identifier.

In one embodiment, a client application can submit, to the session provision service, a PUT request that includes the unique identifier and data to update the data session associated with the unique identifier. The session provision service can then call the cache provision service to determine if a data session exists with that unique identifier. If the data session exists, the data session is updated according to the data received from the client application. The updated data from the data session can then be transmitted to the session provision service and then to the client application.

In one embodiment, a client application can submit, to the session provision service, a DELETE request that includes the unique identifier of the data session to be deleted. In one embodiment, the DELETE request further identifies or defines the scope of data requested for deletion. The session provision service can then call the cache provision service to determine if a data session exists with that unique identifier. If the data session exists, the data session, or a portion of the data session, is deleted according to the request received from the client application. The updated and/or deleted data from the data session can then be transmitted to the session provision service and then to the client application to confirm that data was deleted.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the disclosure.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed:

1. A computer-implemented method for provisioning a data session comprising:
    receiving at a computer system, from a client application, a request for a session provision service to create a data session;
    at a cache provision service, creating a cache provision endpoint for the data session;
    at the session provision service, storing the cache provision endpoint;
    at a unique identifier service comprising a centralized clock, generating a globally unique identifier for the data session the globally unique identifier based at least in part on a current time received from the centralized clock;
    at the session provision service, storing the unique identifier for the data session;
    transmitting, to the client application, the unique identifier for the data session;
    transmitting, to the client application, the cache provision endpoint;
    receiving, from the client application at the session provision service, a data object and the unique identifier;
    transmitting, by the session provision service, to the cache provision service, the data object and the stored cache provision endpoint for the data session associated with the unique identifier; and
    storing, by the cache provision service, the data object in the data session;

receiving, by the session provision service from a second client application over a network, a GET request that includes the unique identifier;

requesting, from the cache provision service, the data object stored in the data session associated with the unique identifier;

determining, at the cache provision service, if the data session exists; and if the data session exists, returning the data object from the data session to the second client application.

2. The method of claim 1, wherein receiving the request to create the data session comprises receiving a session expiration time limit from the client application.

3. The method of claim 1, wherein the unique identifier comprises a 32-byte key.

4. The method of claim 1, wherein the unique identifier service is executed on a mainframe computer.

5. The method of claim 4, wherein the mainframe computer comprises a z/OS environment.

6. The method of claim 1, further comprising: receiving, from the second client application, a POST request that includes a data object and storing the data object at the data session and returning the unique identifier to the second client application.

7. The method of claim 1, further comprising: receiving, from the second client application, a PUT request that includes the unique identifier and a data object; determining, at the cache provision service, if the data session includes a prior data object; if the data session includes the prior data object, replacing the prior data object with the data object and returning the data object to the second client application.

8. The method of claim 1, further comprising: receiving, from the second client application, a DELETE request that includes the unique identifier; determining, at the cache provision service, if the data session includes a prior data object; and if the data session includes the prior data object, deleting the prior data object from the data session and returning a delete confirmation to the second client application.

9. A system for provisioning a data session, comprising one or more processors, a centralized clock, and one or more memory devices operably coupled to the one or more processors, the one or more memory devices storing executable and operational code effective to cause the one or more processors to:

receive, from a client application, a request to create a data session;

create a cache provision endpoint for the data session;

store the cache provision endpoint;

generate a globally unique identifier for the data session based at least in part on a current time received from the centralized clock;

store the unique identifier for the data session;

transmit, to the client application, the unique identifier for the data session;

transmit, to the client application, the cache provision endpoint;

receive, from the client application at the session provision service, a data object and the unique identifier;

transmit, by the session provision service, to the cache provision service, the data object and the stored cache provision endpoint for the data session associated with the unique identifier; and store, by the cache provision service, the data object in the data session;

receive, by the session provision service from a second client application over a network, a GET request that includes the unique identifier;

request, from the cache provision service, the data object stored in the data session associated with the unique identifier;

determine, at the cache provision service, if the data session exists; and if the data session exists, returning the data object from the data session to the second client application.

10. The system of claim 9, wherein the memory devices stores executable and operational code further effective to cause the one or more processors to: receive a session expiration time limit from the client application and implement the session expiration time limit for the data session.

11. The system of claim 9, wherein at least one of the one or more processors or at least one of the one or more memory devices comprises a z/OS environment.

12. The system of claim 9, wherein the memory devices stores executable and operational code further effective to cause the one or more processors to: receive, from the second client application, a POST request that includes a data object; determine if the data session exists for the client application; and if the data session exists, store the data object at the data session and return the unique identifier to the second client application.

13. The system of claim 9, wherein the memory devices stores executable and operational code further effective to cause the one or more processors to: receive, from the second client application, a PUT request that includes the unique identifier and a data object; determine if the data session includes a prior data object; and if the data session includes the prior data object, replace the prior data object with the data object and return the data object to the second client application.

14. The system of claim 9, wherein the memory devices stores executable and operational code further effective to cause the one or more processors to: receive, from the second client application, a DELETE request that includes the unique identifier; determine if the data session includes a prior data object; and if the data session includes the prior data object, delete the prior data object from the data session and return a delete confirmation to the second client application.

* * * * *